United States Patent [19]

Huang et al.

[11] Patent Number: 5,451,723
[45] Date of Patent: Sep. 19, 1995

[54] ACOUSTIC WAVE TOUCH PANEL FOR USE WITH A NON-ACTIVE STYLUS

[75] Inventors: Jianming Huang, Evanston; Terence J. Knowles, Hanover Park, both of Ill.

[73] Assignee: Carroll Touch, Inc., Round Rock, Tex.

[21] Appl. No.: 347,946

[22] Filed: Dec. 1, 1994

Related U.S. Application Data

[63] Continuation of Ser. No. 138,755, Oct. 18, 1993, abandoned.

[51] Int. Cl.⁶ ............................................. G08C 21/00
[52] U.S. Cl. ..................................... 178/18; 345/177; 367/907
[58] Field of Search ........................... 178/18, 19, 20; 345/173, 179, 177; 367/907

[56] References Cited

U.S. PATENT DOCUMENTS

| | | |
|---|---|---|
| 3,568,102 | 3/1971 | Tseng . |
| 3,673,327 | 6/1972 | Johnson et al. . |
| 3,860,874 | 1/1975 | Malone et al. . |
| 3,883,831 | 5/1975 | Williamson et al. . |
| 3,916,099 | 10/1975 | Hlady . |
| 4,317,055 | 2/1982 | de Bruyne . |
| 4,506,354 | 3/1985 | Hansen . |
| 4,642,423 | 2/1987 | Adler . |
| 4,644,100 | 2/1987 | Brenner et al. . |
| 4,645,870 | 2/1987 | Adler . |
| 4,665,282 | 5/1987 | Sato et al. . |
| 4,700,176 | 10/1987 | Adler . |
| 4,746,914 | 5/1988 | Adler . |
| 4,791,416 | 12/1988 | Adler . |
| 4,825,212 | 4/1989 | Adler et al. . |
| 4,880,665 | 11/1989 | Adler et al. . |
| 4,910,363 | 3/1990 | Kobayashi et al. . |
| 5,072,076 | 12/1991 | Camp, Jr. .................. 178/20 X |
| 5,072,427 | 12/1991 | Knowles . |
| 5,162,618 | 11/1992 | Knowles . |
| 5,177,327 | 1/1993 | Knowles . |
| 5,221,381 | 7/1993 | Duwecs .................... 178/18 X |
| 5,260,521 | 11/1993 | Knowles ................... 178/18 |
| 5,308,936 | 5/1994 | Biggs et al. ............... 178/19 X |
| 5,324,895 | 6/1994 | Inamori et al. .............. 178/20 X |
| 5,329,070 | 7/1994 | Knowles .................... 178/18 |

FOREIGN PATENT DOCUMENTS

| | | |
|---|---|---|
| 0367282 | 5/1990 | European Pat. Off. . |
| 0441567 | 8/1991 | European Pat. Off. . |

OTHER PUBLICATIONS

"The Imcon Pulse Compression Filter and Its Application," Tom A. Martin, *IEEE Transactions on Microwave Theory and Techniques*, vol. MTT-21, No. 4, Apr. 1973.

"Ultrasonic Delay Lines Using Shear Modes In Stripes," A. H. Meitzler, *IRE Transactions on Ultrasonics Engineering*, Jun. 1960.

"The Use of Surface-Elastic-Wave Reflective Gratings in Large Time-Bandwidth Pulse-Compression Filters," Richard C. Williamson and Henry I. Smith, *IEEE Transactions on Microwave Theory and Techniques*, vol. MTT-21, No. 4, Apr. 1973.

"Large-Time-Bandwith-Product Surface Wave Pulse Compressor Employing Reflective Gratings," R. C. Williamson et al., *Electronics Letters*, vol. 8, No. 16, Aug. 10, 1972.

(List continued on next page.)

*Primary Examiner*—Stephen Chin
*Assistant Examiner*—Paul Loomis

[57] ABSTRACT

An acoustic wave touch panel is shown for use with a non-active stylus. The acoustic wave touch panel includes an acoustic wave touch position sensor with an elastomeric substrate 20 overlying the touch position sensor and further including a stiff substrate overlying the elastomeric substrate. When a non-active stylus contacts a surface of the stiff substrate exerting a Z-axis force thereon, the Z-axis force is transmitted through the stiff substrate to the elastomeric substrate. The elastomeric substrate deforms in response to the Z-axis force and transmits the force to the acoustic wave touch sensor, the deformation of the elastomeric substrate absorbing or damping acoustic wave energy like a finger touch on the acoustic wave touch sensor.

56 Claims, 2 Drawing Sheets

OTHER PUBLICATIONS

"A Closed-Form Analysis of Reflective-Array Gratings," P. V. Wright; *IEEE Ultrasonics Symposium*, 1980.

"An Economical Touch Panel Using SAW Absorption," Robert Adler, and Peter J. Desmares, *IEEE Transactions on Ultrasonics, Perroelectrics, and Frequency Control*, vol. UFFC-34, No. 2, Mar. 1987.

"Mechanical Input Admittance of Ultrasonic Delay Lines Operating In Torsional Or Shear Modes," Morio Once, *The Journal of the Acoustical Society of America*, vol. 35, No. 7, pp. 1003–1008, Jul. 1963.

"On Waves In An Elastic Plate," Horace Lamb, F.R.S., (Recieved Jul. 10, 1916).

*Physical Acoustics–Principles and Methods*, Warren P. Mason, Academic Press, vol. 1–Part A, Chapter 2 and 6; 1964.

*Rayleigh and Lamb Waves–Physical Theory and Applications*, Igor Aleksandrovich Viktorov, 1967.

"Guided Wave Propagation in Elongated Cylinders and Plates," T. R. Meeker and A. H. Meitzler, *Bell Telephone Laboratories, Incorporated*, pp. 112–167.

"Guided Wave Ultrasonic Delay Lines," John E. May, Jr., *Bell Telephone Laboratories, Incorporated*, pp. 418–483.

*Electronics Letters*, vol. 27, No. 1, Jan. 3, 1991.

Herts., Gr. Britain, *Electronics Letters*, vol. 23, No. 19, Sep. 10, 1987.

"Acoustic Touch Technology Adds a New Input Dimension," Mark Platshon, *Computer Design*, Mar. 15, 1988.

"Surface Elastic Waves," Richard W. White, *Proceedings of the IEEE*, vol. 58, No. 8, Aug. 1970.

ACOUSTIC WAVE TOUCH PANEL FOR USE WITH A NON-ACTIVE STYLUS

This is a continuation of application Ser. No. 08/138,755 filed Oct. 18, 1993, now abandoned.

TECHNICAL FIELD

The present invention is directed to an acoustic wave touch panel and more particularly to an acoustic wave touch panel that is responsive to a non-active stylus touch thereon.

BACKGROUND OF THE INVENTION

Acoustic wave touch position sensors are known to include a touch substrate having a group of transmitters positioned along a first edge of the substrate for generating Rayleigh waves that propagate through the substrate in an X direction to a group of detectors positioned on a second edge of the substrate opposite to the first edge. A group of transmitters is also positioned along a third edge of the panel for generating Rayleigh waves that propagate through the substrate in a Y direction to a group of detectors positioned on a fourth edge of the substrate opposite to the third edge. Interruption of intersecting waves by touching the panel causes output signals to be developed at an X detector and a Y detector defining the point of intersection. Acoustic touch position sensors are also known wherein only two transducers per axis are required. For each axis, one transducer imparts either a Surface Acoustic Wave or a Shear wave that propagates along the perpendicular axis on which a first reflective grating is disposed to reflect portions of the acoustic wave along plural parallel paths of differing lengths to a second reflective grating. The second reflective grating reflects the surface acoustic wave to a second transducer where the signals are received for processing. The reflective gratings associated with the X-axis are perpendicular to the reflective gratings associated with the Y-axis so as to provide a grid pattern to enable coordinates of a touch on the substrate to be determined. For acoustic touch position sensors that utilize an acoustic wave that can be reflected off an edge of the substrate, for example a Shear wave, the second reflective grating and second transducer may be eliminated. In such a sensor, one transducer imparts the acoustic wave for propagation along the first grating which reflects the acoustic wave along plural parallel paths to a reflective edge of the substrate. The reflective edge of the substrate reflects the acoustic waves back along the plural parallel paths to the first grating which in turn reflects the acoustic waves back to the one transducer for processing.

Although the above-described types of touch panels adequately detect a finger touch on the touch surface of the substrate, they are not responsive to a touch by a non-active stylus of a general type, such as a pen or pencil, having a small, well-defined point of contact with the touch substrate. Acoustic wave touch panels for use with a stylus are known; however, the known panels require a specific type of active stylus. Such active styli typically include a transducer to generate an acoustic wave that is transmitted into the acoustic wave touch substrate wherein the stylus is tethered to the control circuitry of the touch panel. These touch panels typically require complex circuitry and processing to detect a touch on the touch panel by the active stylus.

SUMMARY OF THE INVENTION

In accordance with the present invention, the disadvantages of prior acoustic wave touch position sensors as discussed above have been overcome. The acoustic wave touch panel of the present invention is responsive to a touch thereon from a non-active stylus. Because the acoustic wave touch panel of the present invention is responsive to a non-active stylus, the touch panel is universal in nature in that it can be used with any type of stylus including a pen or pencil. Further, the touch panel utilizes conventional acoustic wave touch panel circuitry and processing to detect a touch by the stylus so as to be very cost-effective and simple to manufacture.

More particularly, the acoustic wave touch panel of the present invention includes an acoustic wave propagating substrate having a touch responsive surface and at least one acoustic wave generator mounted on the substrate to propagate an acoustic wave along a path. A Z-axis force by an acoustic wave absorber or damper contacting a sufficient area on the touch surface intersecting the path of the acoustic wave forms a detectable perturbation in the acoustic wave. An elastomeric layer that absorbs/damps acoustic waves overlies the touch responsive surface of the acoustic wave propagating substrate. The elastomeric layer is elastically deformable in response to a Z-axis force to transmit the Z-axis force to the acoustic wave propagating substrate to cause a perturbation in the acoustic wave. A load spreading plate with a stylus contacting surface is provided so as to overlie the elastomeric layer. The load spreading plate transmits to the elastomeric layer a Z-axis force over an area that is greater than the contact area of the non-active stylus to cause a detectable perturbation in the acoustic wave propagating in the acoustic wave substrate.

The acoustic wave propagating substrate may take the form of any acoustic wave touch sensor including those utilizing Shear waves, Surface Acoustic Waves, Love waves, etc. The acoustic wave propagating substrate may also be of the type that converts one type of acoustic wave to another type of acoustic wave such as a touch sensor with Shear to Lamb wave conversion. The acoustic wave propagating substrate may include a reflective array for propagating acoustic waves along a plurality of generally parallel paths. Alternatively, the acoustic wave propagating substrate may utilize a transmitter and receiver pair or a transceiver in association with each discrete path of propagation of the acoustic wave in the touch panel.

The elastomeric layer may be any flexible, elastically deformable, acoustic wave energy absorber or damper. For example, the elastomeric substrate may be formed of polyurethane or rubber. The elastomeric layer preferably has a Youngs Modulus of $1 \times 10^6$ Newtons/meter$^2$ to $1 \times 10^9$ Newtons/meter$^2$.

The load spreading plate preferably has a Youngs Modulus in the approximate range of $0.3 \times 10^{10}$ Newtons/meter$^2$ to $8 \times 10^{10}$ Newtons/meter$^2$ and a shearing modulus in the approximate range of $0.10 \times 10^{10}$ Newtons/meter$^2$ to $3 \times 10^{10}$ Newtons/meter$^2$. For example, a suitable rigid substrate may take the form of glass or a hard plastic such as PET.

In a preferred embodiment, the acoustic wave propagating substrate, elastomeric layer and load spreading plate are each formed of a transparent material so that the acoustic wave touch panel may overlay a display that depicts the location of touches by a non-active stylus on the touch panel. This enables the user to see what he has written with the non-active stylus on the acoustic wave touch panel of the present invention. It is noted, that a hard copy of touch entries on the acoustic wave touch panel of the present invention may be obtained by placing a piece of paper on the stylus contacting surface of the load spreading plate. A pen or pencil can be used to write on the paper wherein the Z-axis force from the pen or pencil is transmitted through the paper to the load spreading plate as if the stylus were in direct contact with the load spreading plate.

The acoustic wave touch panel in accordance with the present invention has high resolution so as to be suitable for handwriting and signature recognition systems. Further, a user can rest his hand on the panel of the present invention to write with a nonactive stylus without affecting the operation of the panel because a hand resting on the panel while writing creates a negligible Z-axis force per unit area compared to the Z-axis force per unit area created by the stylus. These and other objects, advantages and novel features of the present invention, as well as details of an illustrated embodiment thereof, will be more fully understood from the following description and the drawing.

DESCRIPTION OF THE PREFERRED EMBODIMENT

Figure 1:
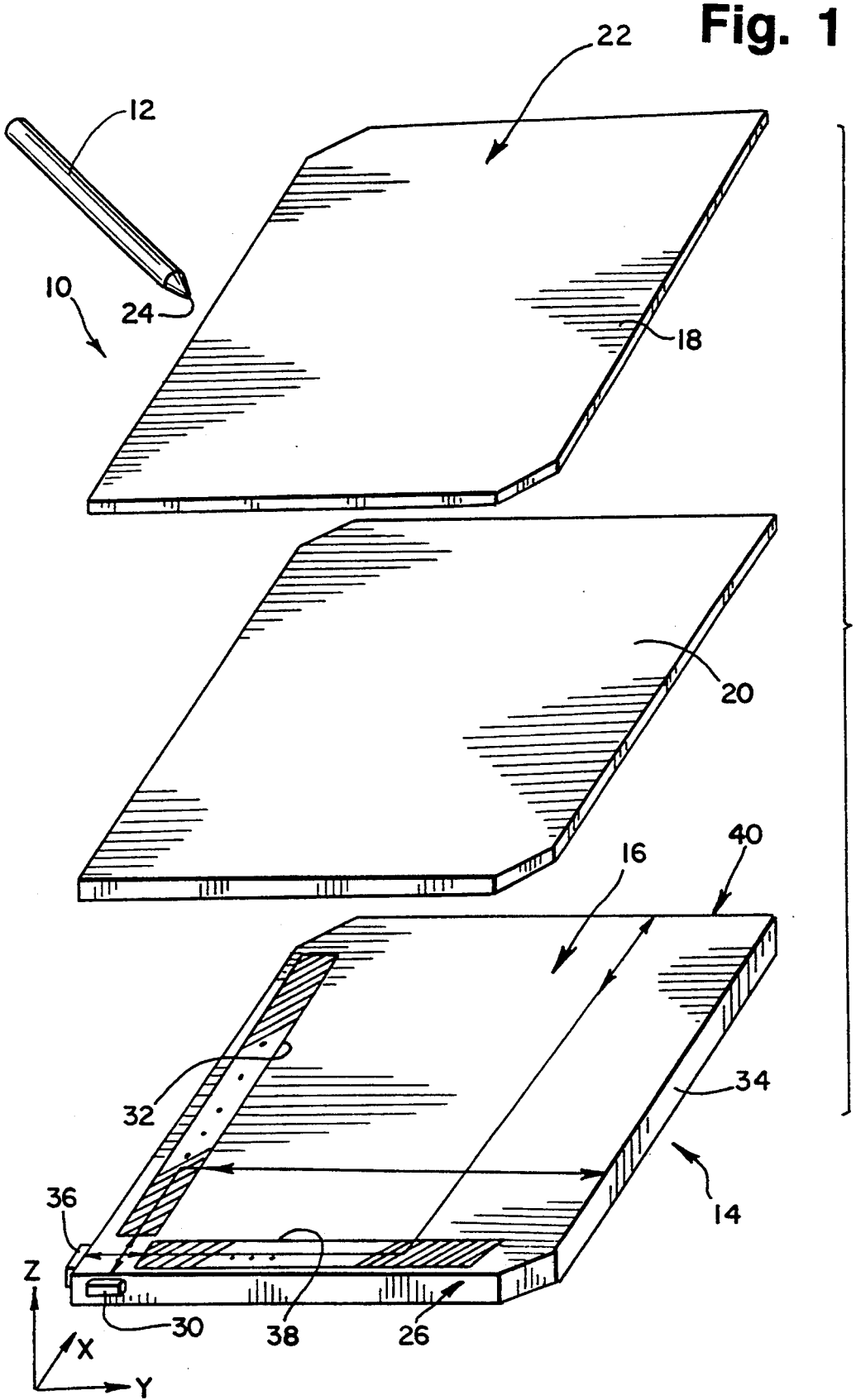
FIG. 1 is an exploded perspective view of an acoustic wave touch panel for use with a non-active stylus in accordance with the present invention.
Figure 2:
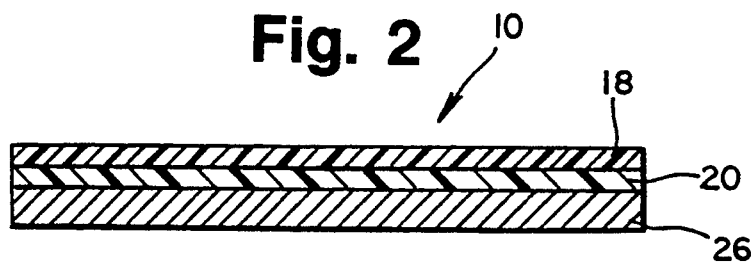
FIG. 2 is a cross-sectional view of the acoustic wave touch panel depicted in FIG. 1.

An acoustic wave touch panel 10 for use with a non-active stylus 12 in accordance with the present invention is shown in FIGS. 1-3. The acoustic wave touch panel 10 includes an acoustic wave propagating touch position sensor 14 that propagates acoustic waves along a number of spaced paths extending parallel to the X-axis and along a number of spaced paths extending parallel to the Y-axis. The touch position sensor 14 is such that a finger touch on a touch surface 16 thereof causes a perturbation in the acoustic waves propagating along two paths that are parallel to the X and Y-axis respectively and that intersect the position of the touch on the substrate. The acoustic wave with the perturbation therein is detectable by the sensor 14 as is well known so as to determine the position of the finger touch on the touch surface 16. In order to make the acoustic wave propagating touch position sensor 14 responsive to any non-active stylus that can transmit a Z-axis force, a load spreading plate 18 is provided so as to overlie an elastomeric layer 20 which in turn overlies the finger touch responsive surface 16 of the touch position sensor 14. It is noted that, as used herein, the term non-active stylus includes any pointed tool as well as a user's finger wherein the stylus does not include a signal generating or receiving mechanism.

The load spreading plate 18 has an upper, stylus contacting surface 22. The load spreading plate 18 spreads the force created by the small contact point 24 of the stylus 12 over a localized area 48 of the load spreading plate 18 that is larger than the contact point 24 of the stylus 12. This generally evenly distributed Z-axis force created in the load spreading plate 18 is transmitted to the elastomeric layer 20. The elastomeric layer 20 is responsive to the Z-axis force from the load spreading plate 18 to elastically deform creating a localized area 52 on the elastomeric layer 20 that is compressed against the touch surface of the substrate 26 so as to make substantially continuous contact with substrate 26 in the area 52. The Z-axis force from the load spreading plate is thereby transmitted to the substrate 26 over the localized area 52 that is greater than the area on the surface 22 of the plate 18 contacted by the stylus.

Figure 3A:
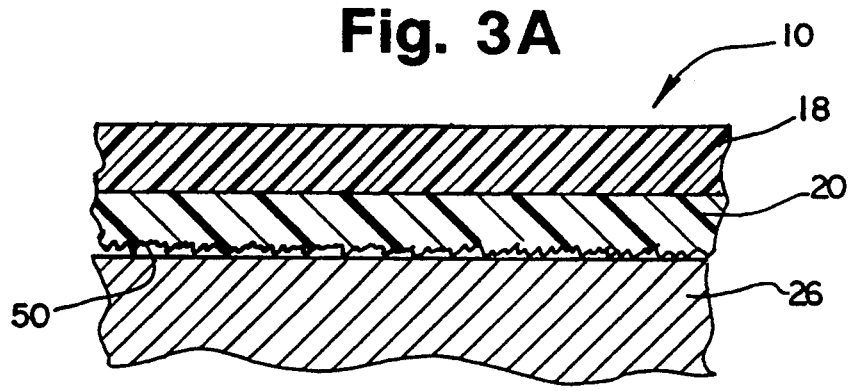
FIG. 3A is an illustration of a microscopic view of a cross-section of the touch panel of FIG. 1 when untouched.
Figure 3B:
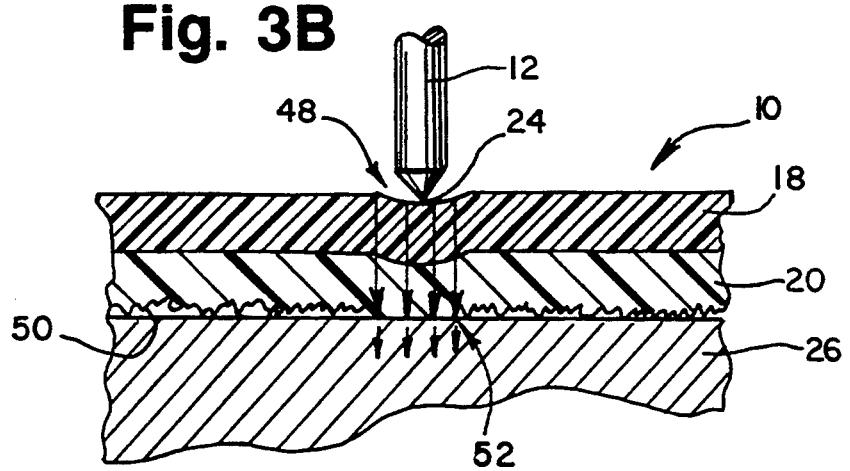
FIG. 3B is an illustration of a microscopic view of a cross-section of the touch panel of FIG. 1 when contacted by a stylus.

As shown in FIG. 3A, before the application of a Z-axis force, the surface 50 of the elastomeric layer 20 adjacent to the touch surface on the substrate 26 is generally not smooth on a microscopic scale. Therefore, although the elastomeric layer 20 is of an acoustic wave perturbating material, without a Z-axis force, the layer 20 does not perturb the acoustic wave in the substrate 26 to any great degree. However, in the presence of a Z-axis force by the stylus 12, as shown in FIG. 3B, the compliant nature of the elastomer causes the coupling surface 50 to flatten or compress so as to make substantially continuous contact in the localized area 52 and thereby acoustically couple to the acoustic wave touch position sensor 14 while transmitting the Z-axis force over the area 52 to the sensor 14. The portion of the elastomeric layer 20 deformed by the Z-axis force created by the stylus 12 absorbs or damps acoustic wave energy propagating in the substrate 26 of the acoustic wave touch position sensor in the same manner as a finger touch absorbs or damps acoustic wave energy.

Materials that are sufficiently rigid to form the load spreading plate 18 include glass and hard plastics such as PET. These materials preferably have a Youngs Modulus in the approximate range of $0.3 \times 10^{10}$ Newtons/meter$^2$ to $8 \times 10^{10}$ Newtons/meter$^2$ and a shearing modulus in the approximate range of $0.10 \times 10^{10}$ Newtons/meter$^2$ to $3 \times 10^{10}$ Newtons/meter$^2$ over a range of thicknesses between 40 mils. to 5 mils. It has been found, for example, that a load spreading plate 18 formed of soda-lime glass of thicknesses between 10-20 mils works quite well. In general, the stiffness of the plate 28 must be rigid enough to distribute the Z-axis force of a stylus over a localized area that is greater than the area of contact with the stylus. However, the plate 18 should not be so rigid as to transmit a force that is not generally localized.

The elastomeric layer 20 is formed of an acoustic wave energy absorbing or damping material which is elastically deformable in response to a Z-axis force transmitted thereto through the load spreading plate 18. Preferably, Youngs modulus for the elastomeric layer 20 is $1 \times 10^6$ Newtons/meter$^2$—$1 \times 10^9$ Newtons/meter$^2$. The elastomeric layer may be formed of urethanes, polyurethane, natural rubber or the like. In general, the elastomeric layer 20, when contacted directly by the small point 24 of the stylus, does not distribute the force over an area significantly greater than the stylus contact area so that the force does not create a detectable perturbation in the acoustic wave propagating in the touch position sensor 14. It is noted, however, that some elastomeric materials such as a hard rubber will distribute the force of the stylus over an area greater than the stylus contact area obviating the need for the load spreading plate 18.

As shown in FIG. 1, the touch position sensor 14 includes a transceiver for transmitting and receiving Shear waves and, in particular, zeroth order horizontally polarized Shear waves for propagation along an axis of a reflective array 32, the axis of which extends parallel to the X-axis. As the Shear wave propagates along the axis of the array 32, the reflective elements of the array 32 reflect portions of the Shear wave incident thereto along substantially parallel paths representing various axial positions with respect to the X-axis. A reflective edge 34 of the substrate 26 reflects Shear waves back along the parallel paths to the reflective array 32 which in turn reflects the Shear waves incident thereto back to the transceiver 30. Similarly, a transceiver 36 is mounted on an edge of the substrate 26 so as to impart a Shear wave for propagation along an axis of a reflective array 38, the axis being parallel to the Y-axis. Shear waves incident to the reflective array 38 are reflected thereby along a number of parallel paths representing various axial positions with respect to the Y-axis, across the substrate 26 to a reflective edge 40. The reflective edge 40 reflects the Shear waves back to the reflective array 38 along the parallel paths, the reflective array 38 in turn reflecting the Shear waves incident thereto back to the transducer 36. Such a touch position sensor is shown in detail in U.S. Pat. No. 5,177,327 assigned to the Assignee of the present invention and incorporated herein by reference. Further, the preferred controller for the sensor 14 is described in detail in U.S. patent application Ser. No. 07/972,605 filed Nov. 6, 1992, assigned to the Assignee of the present invention and incorporated herein by reference.

Although the touch position sensor 14 is depicted in FIG. 1 as utilizing Shear waves, the touch panel 10 may utilize a touch position sensor 14 in which various other acoustic waves propagate such as Surface Acoustic Waves, Lamb Waves, Love Waves, etc. wherein the acoustic wave energy propagating in the substrate of the sensor is absorbed or damped by the deformation of the elastomeric layer 20. Further, acoustic wave touch position sensors that convert one type of acoustic wave to another may also be used. One such touch position sensor is a Shear to Lamb Wave converting acoustic wave touch position sensor as shown in U.S. Pat. No. 5,072,427 assigned to the Assignee of the present invention and incorporated herein by reference.

The touch panel 10 may be used in applications requiring very high resolution such as in handwriting and signature recognition systems. It can be shown that the maximum number of resolvable points per inch, $R_{MAX}$, for the panel 10 is approximately given by the expression:

$$R_{MAX} = \frac{S_{NR} \cdot \alpha}{W}$$

Where $S_{NR}$ is the signal to noise ratio, W is the width of the reflective array 32, 38 and $\alpha$ is the fraction of acoustic wave energy absorbed in an acoustic path as a result of a Z-axis force by the stylus 12. For example, if W=0.25 inches and $S_{NR}$=300/1, i.e. 50db, then to achieve 300 points per inch, $\alpha$ should be at least 0.25 such that 25% of the available acoustic energy in a path is absorbed or perturbated by the Z-axis force. Therefore, for certain applications, those acoustic waves having a Z-axis displacement component that dominates, such as first order Lamb Wave modes or Rayleigh waves, i.e. Surface Acoustic Waves, may be preferred over a Zeroth Order Horizontally Polarized Shear wave. For such applications a Shear to Lamb Wave converting acoustic touch position sensor 14 in particular appears to be the most sensitive.

It is noted that some materials contacting a Surface Acoustic Wave touch panel completely absorb the Surface Acoustic Wave energy therein or almost completely absorb the energy so as not to be suitable for the elastomeric layer 20 when utilized with a Surface Acoustic Wave touch sensor. However, it has been found that polyurethane, for example, does not completely absorb Surface Acoustic Waves. Thus, for a Surface Acoustic Wave touch panel in accordance with the present invention, polyurethane or other materials that do not completely absorb the Surface Acoustic Wave may be utilized for the elastomeric layer 20. Surface Acoustic Wave touch position sensors have been found to be undesirable because of their excessive sensitivity to the presence of liquids, grease and sealing compounds on the touch surface of the Surface Acoustic Wave substrate. However, a Surface Acoustic Wave touch position sensor having an overlay of the elastomeric layer 20 in accordance with the present invention overcomes these problems of prior Surface Acoustic Wave touch position sensors. Because the touch surface of a Surface Acoustic Wave touch position sensor is contacted only by the elastomeric layer 20 in accordance with the present invention, it is impervious to liquids, grease and sealing compounds. These contaminants on the outer surface of the elastomeric layer 20 if used alone or on the surface 22 of the load spreading plate 18 do not create a Z axis force of sufficient magnitude and localization to be recognized by the sensor 14.

Although the touch position sensor 14 is shown utilizing two transceivers and two reflective arrays, the touch position sensor may be formed utilizing two reflective arrays and two transducers per axis as is well-known. Alternatively, the acoustic wave touch position sensor may be formed without reflective arrays but utilize discrete acoustic wave transmitters and receivers or discrete acoustic wave transceivers.

Each of the layers 18, 20, and 26 forming the panel 10 is preferably transparent so as to be able to overlie a display that visually depicts the position of a touch on the panel 10. In order to reduce reflections, an anti-reflective coating such as an HEA coating from Optical Coatings Laboratory, Inc., Santa Rosa, Calif., may be applied to any or all of the substrates 18, 20, and 26. It has been found that an anti-reflective coating applied to the elastomeric substrate 20 on the surface contacting the substrate 26 of the touch position sensor 14 substantially reduces internal reflections. Further, the elastomeric layer 20 may be bonded to the load spreading plate 18 to eliminate reflections at its boundary.

It is noted, that a hard copy of touch entries on the acoustic wave touch panel of the present invention may be obtained by placing a piece of paper on the stylus contacting surface of the load spreading plate. A pen or pencil can be used to write on the paper wherein the Z-axis force from the pen or pencil is transmitted through the paper to the load spreading substrate as if the stylus were in direct contact with the stiff substrate. It is further noted that the acoustic wave touch panel 10 of the present invention is not responsive to contact by the user's hand while writing on the touch panel 10 with the stylus 12. This is because the force on the touch panel created by the user's hand resting on the surface 22 to write is spread out over a large area of the panel, as opposed to the small stylus contact area, so that the Z-axis force per unit area created by the user's hand is relatively low compared to the Z-axis force per unit area created by the stylus. The touch panel 10 is similarly non-responsive to contaminants such as liquids, grease, etc. as discussed above.

Although the elastomeric layer 20 is shown as being continuous, other noncontinuous, equivalent layers may also be employed in accordance with the present invention. For example, spacers silk screened or otherwise patterned onto the touch responsive surface may be more appropriate for use with elastomers that have slight tack or for non-elastomeric but pliant acoustic wave absorbing damping layers such as vinyl or the like. Many other modifications may be made in the above-described apparatus without departing from the scope of the present invention. Therefore, it is intended that the above description and drawing be interpreted as illustrative and not in the limiting sense.

What is claimed and desired to be secured by Letters Patent is:

1. An acoustic wave touch panel responsive to a non-active stylus touch thereon comprising:
    an acoustic wave propagating substrate having a touch responsive surface and at least one acoustic wave generator mounted on said substrate to propagate acoustic waves along a plurality of generally parallel paths each representing a different axial touch position, a Z-axis force over a localized area of said touch surface by an acoustic wave perturbating material forming a detectable perturbation in an acoustic wave intersecting said force;
    an elastomeric layer overlying said touch responsive surface of said acoustic wave propagating substrate, said elastomeric layer being elastically deformable in response to a Z-axis force to transmit said Z-axis force to said acoustic wave propagating substrate to cause a perturbation in said acoustic wave; and
    a load spreading plate with a stylus contacting surface, said plate overlying said elastomeric layer and transmitting to said elastomeric layer a Z-axis force generated by a non-active stylus contacting said load spreading plate surface to cause a detectable perturbation in an acoustic wave propagating in said acoustic wave substrate.

2. An acoustic wave touch panel as recited in claim 1 wherein said load spreading plate has a Youngs Modulus in the approximate range of $0.3 \times 10^{10}$ Newtons/meter$^2$ to $8 \times 10^{10}$ Newtons/meter$^2$ and a Shearing modulus in the approximate range of $0.10 \times 10^{10}$ Newtons/meter$^2$ to $3 \times 10^{10}$ Newtons/meter$^2$.

3. An acoustic wave touch panel as recited in claim 1 wherein said load spreading plate is glass.

4. An acoustic wave touch panel as recited in claim 3 wherein said load spreading plate has a thickness between 10-20 mils.

5. An acoustic wave touch panel as recited in claim 1 wherein said load spreading plate is a hard plastic.

6. An acoustic wave touch panel as recited in claim 5 wherein said hard plastic is PET.

7. An acoustic wave touch panel as recited in claim 1 wherein said load spreading plate is transparent.

8. An acoustic wave touch panel as recited in claim 1 wherein said elastomeric layer is a polyurethane.

9. An acoustic wave touch panel as recited in claim 1 wherein said elastomeric layer is a rubber.

10. An acoustic wave touch panel as recited in claim 9 wherein said elastomeric layer has a Youngs Modulus in the approximate range of $1 \times 10^6$ Newtons/meter$^2$ to $1 \times 10^9$ Newtons/meter$^2$.

11. An acoustic wave touch panel as recited in claim 1 wherein said elastomeric layer is transparent.

12. An acoustic wave touch panel as recited in claim 1 wherein said acoustic wave generator generates a Shear wave for propagation in said acoustic wave propagating substrate.

13. An acoustic wave touch panel as recited in claim 1 wherein said acoustic wave generator generates a Surface Acoustic Wave for propagation in said acoustic wave propagating substrate.

14. An acoustic wave touch panel as recited in claim 1 wherein said acoustic wave generator generates a Lamb wave for propagation in said acoustic wave propagating substrate.

15. An acoustic wave touch panel as recited in claim 1 wherein said acoustic wave generator generates a Love wave for propagation in said acoustic wave propagating substrate.

16. An acoustic wave touch panel as recited in claim 1 wherein said acoustic wave generator generates a Zeroth Order Horizontally Polarized Shear wave for propagation in said acoustic wave propagating substrate.

17. An acoustic wave touch panel as recited in claim 1 wherein said acoustic wave generator includes an acoustic wave transceiver.

18. An acoustic wave touch panel as recited in claim 1 wherein said acoustic wave generator includes an acoustic wave transmitter and further including an acoustic wave receiver mounted on said acoustic wave propagating substrate.

19. An acoustic wave touch panel as recited in claim 1 wherein said acoustic wave generator includes at least one acoustic wave reflective array.

20. An acoustic wave touch panel as recited in claim 1 wherein said acoustic wave generator includes a plurality of discrete acoustic wave transmitters.

21. An acoustic wave touch panel as recited in claim 1 wherein said acoustic wave generator includes a plurality of discrete acoustic wave transceivers.

22. An acoustic wave touch panel responsive to a non-active stylus touch thereon comprising:
    an acoustic wave propagating substrate having a touch responsive surface and at least one acoustic wave generator mounted on said substrate to propagate an acoustic wave along a path, a Z-axis force by an acoustic wave perturbating material on said touch surface at a position along said path forming a detectable perturbation in said acoustic wave;
    an elastomeric layer overlying said touch responsive surface of said acoustic wave propagating substrate, said elastomeric layer being elastically deformable in response to a Z-axis force to transmit said Z-axis force to said acoustic wave propagating substrate to cause a perturbation in said acoustic wave; and
    a load spreading plate with a stylus contacting surface, said load spreading plate overlying said elastomeric layer and transmitting to said elastomeric layer a Z-axis force generated by a non-active stylus contacting said load spreading plate surface to cause a detectable perturbation in an acoustic wave propagating in said acoustic wave substrate.

23. An acoustic wave touch panel as recited in claim 22 where said load spreading plate has a Youngs Modulus in the approximate range of $0.3 \times 10^{10}$ Newtons/meter$^2$ to $8 \times 10^{10}$ Newtons/meter$^2$ and a Shearing modulus in the approximate range of $0.10 \times 10^{10}$ Newtons/meter$^2$ to $3 \times 10^{10}$ Newtons/meter$^2$.

24. An acoustic wave touch panel as recited in claim 22 wherein said load spreading plate is glass.

25. An acoustic wave touch panel as recited in claim 24 wherein said load spreading plate has a thickness between 10–20 mils.

26. An acoustic wave touch panel as recited in claim 22 wherein said load spreading plate is a hard plastic.

27. An acoustic wave touch panel as recited in claim 26 wherein said hard plastic is PET.

28. An acoustic wave touch panel as recited in claim 22 wherein said load spreading plate is transparent.

29. An acoustic wave touch panel as recited in claim 22 wherein said elastomeric layer is a polyurethane.

30. An acoustic wave touch panel as recited in claim 22 wherein said elastomeric layer is a rubber.

31. An acoustic wave touch panel as recited in claim 30 wherein said elastomeric layer has a Youngs Modulus in the approximate range of $1 \times 10^6$ Newtons/meter$^2$ to $1 \times 10^9$ Newtons/meter$^2$.

32. An acoustic wave touch panel as recited in claim 22 wherein said elastomeric layer is transparent.

33. An acoustic wave touch panel as recited in claim 22 wherein said acoustic wave generator generates a Shear wave for propagation in said acoustic wave propagating substrate.

34. An acoustic wave touch panel as recited in claim 22 wherein said acoustic wave generator generates a Lamb wave for propagation in said acoustic wave propagating substrate.

35. An acoustic wave touch panel as recited in claim 22 wherein said acoustic wave generator generates a Love wave for propagation in said acoustic wave propagating substrate.

36. An acoustic wave touch panel as recited in claim 22 wherein said acoustic wave generator generates a Surface Acoustic Wave for propagation in said acoustic wave propagating substrate.

37. An acoustic wave touch panel as recited in claim 22 wherein said acoustic wave generator includes an acoustic wave transceiver.

38. An acoustic wave touch panel as recited in claim 22 wherein said acoustic wave generator includes an acoustic wave transmitter and further including an acoustic wave receiver mounted on said substrate.

39. An acoustic wave touch panel responsive to a non-active stylus touch thereon comprising:
a transparent acoustic wave propagating substrate having a touch responsive surface and at least one acoustic wave generator mounted on said substrate to propagate acoustic waves along a plurality of generally parallel paths each representing a different axial touch position, a Z-axis force on said touch surface by an acoustic wave perturbating material forming a detectable perturbation in an acoustic wave intersecting said touch;
a transparent elastomeric layer overlying said touch responsive surface of said acoustic wave propagating substrate, said elastomeric layer being elastically deformable in response to a Z-axis force to transmit said Z-axis force to said acoustic wave propagating substrate to cause a perturbation in said acoustic wave;
a transparent load spreading plate with a stylus contacting surface, said load spreading plate overlying said elastomeric layer and transmitting to said elastomeric layer a Z-axis force generated by a non-active stylus contacting said load spreading plate surface to cause a detectable perturbation in an acoustic wave propagating in said acoustic wave substrate; and
an anti-reflective coating on at least one of said elastomeric layer, load spreading plate or substrate.

40. An acoustic wave touch panel as recited in claim 39 wherein said load spreading plate has a Youngs Modulus in the approximate range of $0.3 \times 10^{10}$ Newtons/meter$^2$ to $8 \times 10^{10}$ Newtons/meter$^2$ and a Shearing modulus in the approximate range of $0.10 \times 10^{10}$ Newtons/meter$^2$ to $3 \times 10^{10}$ Newtons/meter$^2$.

41. An acoustic wave touch panel as recited in claim 39 wherein said load spreading plate is glass.

42. An acoustic wave touch panel as recited in claim 41 wherein said load spreading plate has a thickness between 10–20 mils.

43. An acoustic wave touch panel as recited in claim 39 wherein said load spreading plate is a hard plastic.

44. An acoustic wave touch panel as recited in claim 39 wherein said elastomeric layer has a Youngs Modulus in the approximate range of $1 \times 10^6$ Newtons/meter$^2$ to $1 \times 10^9$ Newtons/meter$^2$.

45. An acoustic wave touch panel as recited in claim 39 wherein said elastomeric layer is a polyurethane.

46. An acoustic wave touch panel as recited in claim 39 wherein said elastomeric layer is a rubber.

47. An acoustic wave touch panel as recited in claim 39 wherein said acoustic wave generator generates a Shear wave for propagation in said acoustic wave propagating substrate.

48. An acoustic wave touch panel as recited in claim 39 wherein said acoustic wave generator generates a Surface Acoustic Wave for propagation in said acoustic wave propagating substrate.

49. An acoustic wave touch panel as recited in claim 39 wherein said acoustic wave generator generates a Lamb wave for propagation in said acoustic wave propagating substrate.

50. An acoustic wave touch panel as recited in claim 39 wherein said acoustic wave generator generates a Love wave for propagation in said acoustic wave propagating substrate.

51. An acoustic wave touch panel as recited in claim 39 wherein said acoustic wave generator generates a Zeroth Order Horizontally Polarized Shear wave for propagation in said acoustic wave propagating substrate.

52. An acoustic wave touch panel responsive to a non-active stylus touch thereon, comprising:
an acoustic wave propagating substrate having a touch responsive surface and at least one acoustic wave generator mounted on said substrate to propagate an acoustic wave along a path, a Z-axis force by an acoustic wave perturbating material on said touch surface at a position along said path forming a detectable perturbation in said acoustic wave;
an overlay mounted on said touch responsive surface of said acoustic wave propagating substrate, said overlay including an acoustic wave perturbating material disposed adjacent said touch responsive surface, said acoustic wave perturbating material being responsive to a non-active stylus contact on said overlay creating a Z-axis force for transmitting to said acoustic wave propagating substrate a Z-axis force over a localized area that is greater than said stylus contact area.

53. An acoustic wave touch panel as recited in claim 52 wherein said overlay includes a load spreading plate for distributing the force from the non-active stylus to said acoustic wave perturbating material.

54. An acoustic wave touch panel comprising:

an acoustic wave propagating substrate having a touch responsive surface and at least one acoustic wave generator mounted on said substrate to propagate an acoustic wave along a path, a Z-axis force by an acoustic wave perturbating material on said touch surface at a position along said path forming a detectable perturbation in said acoustic wave;

an overlay mounted on said touch responsive surface of said acoustic wave propagating substrate, said overlay including an acoustic wave perturbating material disposed adjacent said touch responsive surface and having a Youngs Modulus in the approximate range of $1 \times 10^6$ Newtons/meter$^2$ to $1 \times 10^9$ Newtons/meter$^2$, said acoustic wave perturbating material being responsive to a Z-axis force on said overlay for transmitting a Z axis force to said acoustic wave propagating substrate.

55. An acoustic wave touch panel as recited in claim 54 wherein said overlay includes a load spreading plate for distributing the Z-axis force on said overlay to said acoustic wave perturbating material.

56. An acoustic wave touch panel as recited in claim 54 wherein said load spreading plate has a Youngs Modulus in the approximate range of $0.3 \times 10^{10}$ Newtons/meter$^2$ to $8 \times 10^{10}$ Newtons/meter$^2$ and a Shearing modulus in the approximate range of $0.10 \times 10^{10}$ Newtons/meter$^2$ to $3 \times 10^{10}$ Newtons/meter$^2$.

* * * * *